(12) United States Patent
Belke

(10) Patent No.: US 12,012,495 B1
(45) Date of Patent: Jun. 18, 2024

(54) 3-D PRINTABLE EXPENDABLE LOST FOAM PATTERN

(71) Applicant: Brunswick Corporation, Mettawa, IL (US)

(72) Inventor: Jacob A. Belke, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 141 days.

(21) Appl. No.: 17/697,633

(22) Filed: Mar. 17, 2022

(51) Int. Cl.
| | |
|---|---|
| B22C 7/02 | (2006.01) |
| B22C 9/04 | (2006.01) |
| B33Y 40/20 | (2020.01) |
| B33Y 50/00 | (2015.01) |
| B33Y 70/10 | (2020.01) |
| B33Y 80/00 | (2015.01) |
| C08J 7/06 | (2006.01) |
| C08J 9/00 | (2006.01) |
| B33Y 30/00 | (2015.01) |

(52) U.S. Cl.
CPC ............. *C08J 9/0061* (2013.01); *B22C 7/023* (2013.01); *B22C 9/04* (2013.01); *B33Y 40/20* (2020.01); *B33Y 50/00* (2014.12); *B33Y 70/10* (2020.01); *B33Y 80/00* (2014.12); *C08J 7/06* (2013.01); *B33Y 30/00* (2014.12)

(58) Field of Classification Search
CPC .............. B22C 7/02; B22C 7/023; B22C 9/04
USPC ............................................ 164/34, 45, 235
See application file for complete search history.

(56) References Cited

U.S. PATENT DOCUMENTS

| 5,960,851 A | 10/1999 | Donahue |
| 6,024,157 A | 2/2000 | Donahue et al. |
| 9,556,318 B2 | 1/2017 | Gossi |

FOREIGN PATENT DOCUMENTS

| CN | 103934415 A | * | 7/2014 | ........... B29C 64/314 |

OTHER PUBLICATIONS

Machine translation of CN 103934415 A (Year: 2014).*

* cited by examiner

*Primary Examiner* — Kevin P Kerns
(74) *Attorney, Agent, or Firm* — Andrus Intellectual Property Law, LLP

(57) ABSTRACT

A lost foam casting pattern that is constructed of a plastic filament, a foaming agent, and a coating. The lost foam casting pattern is printable on a 3-D printer. A 3-D printable material for the creation of a lost foam casting pattern is also disclosed where the material includes 95.0% to 99.75% by weight of a plastic filament combined with 0.25% to 5.00% by weight of a foaming agent. A method for preparing a lost foam casting pattern using the 3-D printable material is further described.

6 Claims, 1 Drawing Sheet

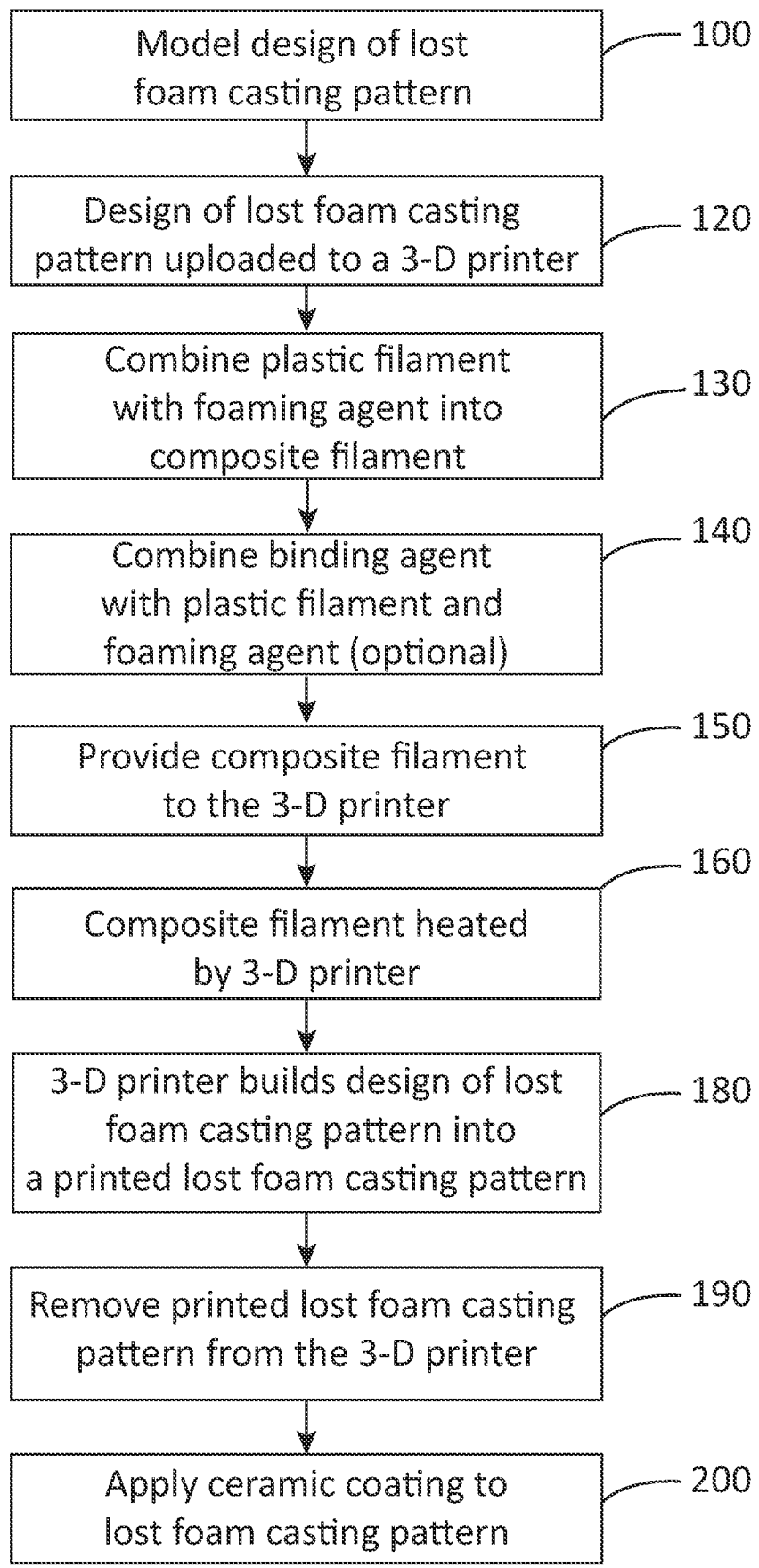

3-D PRINTABLE EXPENDABLE LOST FOAM PATTERN

FIELD

The present disclosure relates to the lost foam casting process, and more particularly to patterns used in the lost foam casting process.

BACKGROUND

The following are incorporated herein by reference in entirety:

U.S. Pat. No. 5,960,851 discloses a method of lost foam casting of aluminum silicon alloys utilizing a pattern formed of an expendable polymeric foam having a decomposition temperature less than 300° C., and a heat of decomposition less than 600 Joules per gram. The foam pattern preferably has a heat of fusion less than 60 Joules per gram and a bulk density in the range of one to four pounds per cubic foot. The lost foam casting procedure disclosed in this patent has particular use when casting hypereutectic aluminum silicon alloys containing from 16 to 30% silicon U.S. Pat. No. 6,024,157 discloses a method of casting hypereutectic aluminum-silicon alloys in an evaporable foam casting process with the application of pressure during the solidification of the alloy. A pattern is formed from a polymeric material having a configuration of an article to be cast. The pattern is supported in an outer mold and unbounded sand surrounds the pattern and fills the cavities within the pattern. The pattern is contacted with a molten hypereutectic aluminum-silicon alloy containing 16% to 30% silicon and having less than 0.8% copper. The molten alloy decomposes the foam pattern with the vapors of decomposition being entrapped within the interstices of the sand. While the alloy is in the molten state, gas pressure is applied to the alloy in the magnitude of 5 to 12 atmospheres to produce a cast alloy having less than 0.03% porosity and a high cycle fatigue strength greater than 13 KSI.

U.S. Pat. No. 9,556,318, discloses a foamable thermoplastic mixture, comprising (A) at least one thermoplastic polymer selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer, (B) at least one long chain branched polymer as a foam stabilizer selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer and (C) at least one chemical blowing agent, wherein the long chain branched polymer (B) is present in an amount of 1 to 30 wt. % relative to the total weight of thermoplastic polymer (A) and long chain branched polymer (B), and at least one of the following distinguishing features applies to the thermoplastic polymer (A) and the long chain branched polymer (B): 1) the value of the melt flow index (MFI) of the long chain branched polymer (B) (MFI(B)) is smaller than the MFI value of the thermoplastic polymer (A) (MFI(A)), wherein MFI(B) is a maximum of 50% of MFI(A), 2) the g value of the long chain branched polymer (B) (g(B)) is smaller than the g value of the thermoplastic polymer (A) (g(A)), wherein g(B) is a maximum of 80% of g(A), 3) the polymer type of the long chain branched polymer (B) differing from the polymer type of the thermoplastic polymer (A). The foamable thermoplastic mixture can be injection molded without foaming and is suitable for the production of low-density foams which can be used, for example, as damping materials or foamed membranes.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

The present application is directed to a lost foam casting pattern that is constructed of a plastic filament, a foaming agent, and a coating. The lost foam casting pattern is printable on a 3-D printer such as a Fused Filament Fabrication (FFF) printer. The plastic filament may be polypropylene (PP), high density polyethylene (HDPE), polystyrene (PS), high impact polystyrene (HIPS), polycarbonate (PC), polycaprolactone (PCL), polycarbonate+acrylic-styrene-acrylate (PC/ASA), Linear Low Density Polyethylene (LLDPE), polyamides/nylons, acrylonitrile butadiene styrene (ABS) or a combination thereof. The foaming agent may be azodicarbonamide, sodium bicarbonate+citric acid, zinc stearate, calcium stearate, 5-phenyltetrazole, or a combination thereof. Relative to the overall weight of the product, the foaming agent is added in an amount of 0.01% to 10.0% by weight, alternatively, in an amount of 0.25% to 5.00% by weight, and still further alternatively in an amount of 0.50% to 2.50% by weight. The coating may be a porous ceramic coating.

The present application is also directed to a 3-D printable material for the creation of a lost foam casting pattern. In one embodiment, the material comprises 90.00% to 99.99% by weight of a plastic filament and 0.01% to 10.0% by weight of a foaming agent. In another embodiment, the material comprises 95.0% to 99.75% by weight of the plastic filament and 0.25% to 5.00% by weight of the foaming agent. In still another embodiment, the material comprises 97.25% to 99.50% by weight of the plastic filament and 0.50% to 2.50% by weight of the foaming agent. The plastic filament is preferably polypropylene, high density polyethylene, polystyrene, high impact polystyrene, polycarbonate, polycaprolactone, polycarbonate+acrylic-styrene-acrylate, linear low density polyethylene (LLDPE), polyamides/nylons, acrylonitrile butadiene styrene (ABS) or a combination thereof. The foaming agent may be azodicarbonamide, sodium bicarbonate+citric acid, zinc stearate, calcium stearate, 5-phenyltetrazole, or a combination thereof.

The present application is also directed to a method for preparing a lost foam casting pattern. The method may include the steps of modeling a design of the lost foam casting pattern using computer software; uploading the design of the lost foam casting pattern to a 3-D printer; combining a plastic filament with a foaming agent into a composite filament; providing the composite filament to the 3-D printer; heating the composite filament in the 3-D printer; building the design of the lost foam casting pattern into a printed lost foam casting pattern with the 3-D printer;

and removing the printed lost foam casting pattern from the 3-D printer. In other embodiments, the method may further comprise the step of coating the printed lost foam casting pattern with a ceramic coating. In still other embodiments, the step of combining a plastic filament with a foaming agent may further include combining a plastic filament with a foaming agent and a binding agent. In the method, the plastic filament may be selected from polypropylene, high density polyethylene, polystyrene, high impact polystyrene, polycarbonate, polycaprolactone, polycarbonate+acrylic-styrene-acrylate, polystyrene, linear low density polyethylene (LLDPE), polyamides/nylons, acrylonitrile butadiene styrene (ABS) or a combination thereof. The foaming agent may be azodicarbonamide, sodium bicarbonate+citric acid, zinc stearate, calcium stearate, 5-phenyltetrazole, or a combination thereof.

In certain embodiment of the method, the step of combining the plastic filament with the foaming agent into a composite filament comprises combining 90.00% to 99.99% by weight of a plastic filament and 0.01% to 10.0% by weight of a foaming agent. In other embodiments, the step of combining the plastic filament with the foaming agent into a composite filament comprises combining 95.0% to 99.75% by weight of a plastic filament and 0.25% to 5.00% by weight of a foaming agent. In still other embodiments, the step of combining the plastic filament with the foaming agent into a composite filament comprises combining 97.25% to 99.50% by weight of a plastic filament with 0.50% to 2.50% by weight of a foaming agent. In a further embodiment, the step of combining the plastic filament with the foaming agent into a composite filament providing the plastic filament to the 3-D printer comprises providing combining 95.25% to 97.49% by weight of a plastic filament with 0.50% to 2.50% by weight of a foaming agent, and the step of the combining a plastic filament with a foaming agent and a binding agent comprises adding 0.01% to 4.25% of a binding agent to the combination of the plastic filament and foaming agent.

These and other non-limiting embodiments are provided herein.

BRIEF DESCRIPTION OF THE DRAWINGS

The present disclosure is described with reference to the following FIGURES. The same numbers are used throughout the FIGURES to reference like features and like components.

FIG. 1 is a flow chart demonstrating the steps of a method according to the present application.

DETAILED DESCRIPTION OF THE DRAWINGS

In the present disclosure, certain terms have been used for brevity, clarity, and understanding. No unnecessary limitations are to be inferred therefrom beyond the requirement of the prior art because such terms are used only for descriptive purposes and are intended to be broadly construed.

For several decades, rapid prototype printed pattern technology was used in the investment casting industry where a wax-based pattern is 3D printed, shelled, dewaxed, and cast as a traditional investment casting. In this process, this process the term "rapid" is relative because it takes at least 48 hours to produce an acceptable ceramic shell for the investment casting. To meet production requirements in a challenging environment, applicant developed the use of three dimensional (3-D) printing for a different type of rapid prototyping—3-D printing of plastic patterns for the lost foam casting process instead of using conventional polystyrene patterns that were typically created by hand cutting or machining the pattern from a solid block of foam, or by blow molding the patterns. The former is time consuming, while the latter requires an investment in expensive tooling for the blow molding processes. This products and methods of the present application utilize plastic filaments treated with at least one foaming agent to produce a 3-D printed pattern using a 3-D printer that may be rapidly produced in significantly less time than 48 hours. The pattern produced may then be expended during the lost foam casting process in the same manner as traditional lost foam casting patterns.

Multiple 3-D plastic polymer printer filaments were tested for their ability to be cast using the same process as traditional lost foam casting patterns. It was surprisingly discovered that most polymers were unsuitable for this process due to high energy requirements to depolymerize and evaporate the solid material. It was then surprisingly discovered that by adding a foaming agent to the plastic filaments during the 3-D printing process that the density of the printed pattern could be reduced. This resulted in less mass is printed per wall, requiring lower amounts of thermal energy to expend the patterns and resulting in a higher chance of successful filling. The ability to 3D print patterns allows for a degree of design freedom that is usually constrained due to current subtractive manufacturing processes.

A wide range of plastic filaments were tested with and without foaming agent additions to create lost foam casting patterns. Optimal lost foam casting patterns were created using one of the following plastic filaments with the addition of 0.01 to 10% of a foaming agent: polypropylene (PP), high density polyethylene (HDPE), polystyrene (PS), high impact polystyrene (HIPS), polycarbonate (PC), polycaprolactone (PCL), polycarbonate+acrylic-styrene-acrylate (PC/ASA), Linear Low Density Polyethylene (LLDPE), polyamides/nylons, acrylonitrile butadiene styrene (ABS) or a combination thereof. Preferable plastic filaments for both ease of creating the lost foam casting pattern with the addition of a foaming agent, and for utilizing the pattern effectively in the lost foam casting process to make parts were identified as high impact polystyrene (HIPS), polycarbonate (PC), and polystyrene (PS).

The plastic filaments are treated with the addition of 0.01 to 10% of a foaming agent for optimal performance in the lost foam casting process. Effective foam agents are identified as sodium bicarbonate+citric acid, zinc stearate, calcium stearate, 5-phenyltetrazole, or a combination thereof. It is contemplated that titanium hydride, zinc carbonate, toluenesulfonylhydrazide, oxybisbenzenesulfonylhydrazide, or a combination thereof may also be utilized as a foaming agent. In certain embodiments the foaming agent is added in an amount of 0.25% to 5.00% by weight. In another embodiment, the foaming agents are added in an amount of 0.50% to 2.50% by weight.

When the above noted plastic filaments and foaming agents are used to create a 3-D printable material for the creation of a lost foam casting pattern, the material may be 90.00% to 99.99% by weight of a plastic filament and 0.01% to 10.0% by weight of a foaming agent. In other embodiments, the material is 95.0% to 99.75% by weight of the plastic filament and 0.25% to 5.00% by weight of the foaming agent. In still other embodiments, the material is 97.25% to 99.50% by weight of the plastic filament and 0.50% to 2.50% by weight of the foaming agent.

It was surprisingly found that when one of the preferable plastic filaments was combined with one of the preferable foaming agents in the 3-D printing process at the preferable amount of 0.5% to 2.5% foaming agent by weight to create a lost foam casting pattern, that parts cast with such materials had up to 0.1% dimensional accuracy to a modeled part.

Referring now to FIG. 1, therein is shown a method for preparing a lost foam casting pattern using the material described herein. In step 100, a design of the lost foam casting pattern is modeled using computer software. Typically, computer-aided design (CAD) software is utilized. The software may provide some hint as to the structural integrity you can expect in the finished product and provide optimal dimension for the pattern. Next, in step 120, the design of the lost foam casting pattern is uploaded to a 3-D printer. This may involve converting the CAD drawing to the STL format, as known in the art. Most 3-D printers can use STL files in addition to some proprietary file types. The STL file is sent or copied to the computer that controls the 3-D printer. There, a user can designate the size and orientation for printing.

In step 130, a plastic filament is combined with a foaming agent into a composite filament a plastic filament is provided to the 3-D printer. In certain embodiments, step 140 is included, where a binding agent is combined into the composite filament for binding the pattern to a bed plate. In step 150 the composite filament is provided to the 3-D printer. Individual 3-D printers may have their own requirements for how to prepare for a new print job, including refilling the plastic filaments and foaming agents, binders and other consumables the printer will use. Typically, the plastic filament and the foaming agents are provided to the 3-D printer in a solid state. In step 160, the composite filament is heated by the 3-D printer.

In step 180, the 3-D printer builds the design of the lost foam casting pattern into a printed lost foam casting pattern. the build process is mostly automatic. Each layer is usually about 0.1 to 0.3 mm thick, though it may be thinner or thicker. Depending on the pattern's size and/or geometry, the amount of support material needed, the machine and the materials used, the printer settings (e.g. layer height, print speed, acceleration, nozzle size, wall thickness, infill percentage, infill geometry) this process could take hours or even up to 48 hours to complete.

In step 190, the printed lost foam casting pattern is removed from the 3-D printer. Some amount of post-processing may be necessary for the printed pattern. This could include brushing off any remaining powder or bathing the printed object to remove water-soluble supports. The new patterns may be weak during this step since some materials require time to cure, so caution might be necessary to ensure that it doesn't break or fall apart.

Once the pattern is removed, it may be coated with a conventional ceramic coating in step 200, as is known in the art of lost foam casting. The ceramic coating protects the casting metal from sand surrounding the pattern in the lost foam casting process and allows for gasses to vent while casting. The higher the coating permeability, the better. In certain instances, if the coating permeability is not high enough, the pattern may be directly vented with an unrestricted path (infinitely permeable) for gas to escape in expected areas of gas accumulation. The expected areas of gas accumulation depend o part orientation during casting which is not considered in traditional lost foam casting. Traditionally, part orientation during casting is driven by sand filling constraints. In this instance, 3-D printed pattern orientation is determined first by sand fill, then gas accumulation which can be alleviated by direct venting. Once the pattern is coated, the pattern may be used in conventional lost foam casting methods, such as the methods described in U.S. Pat. Nos. 5,960,851 and 6,024,157, which are incorporated herein by reference.

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method for preparing a lost foam casting pattern, the method comprising:
   modeling a design of the lost foam casting pattern using computer software;
   uploading the design of the lost foam casting pattern to a 3-D printer;
   combining a plastic filament with a foaming agent to form a composite filament, wherein the foaming agent is selected from one of: azodicarbonamide, sodium bicarbonate+citric acid, zinc stearate, calcium stearate, 5-phenyltetrazole, and a combination thereof;
   providing the composite filament to the 3-D printer;
   heating the composite filament in the 3-D printer;
   building the design of the lost foam casting pattern into a printed lost foam casting pattern with the 3-D printer;
   removing the printed lost foam casting pattern from the 3-D printer.

2. The method of claim 1, further comprising the step of coating the printed lost foam casting pattern with a ceramic coating.

3. The method of claim 1, further comprising the step of combining a binding agent with the plastic filament and the foaming agent to form a composite filament.

4. The method of claim 1, wherein the plastic filament is selected from one of: polypropylene, high density polyethylene, polystyrene, high impact polystyrene, polycarbonate, polycaprolactone, polycarbonate+acrylic-styrene-acrylate, linear low density polyethylene, polyamides/nylons, acrylonitrile butadiene styrene, and a combination thereof.

5. The method of claim 1, wherein the step of combining the plastic filament with the foaming agent to form the composite filament comprises combining 95.0% to 99.75% by weight of a plastic filament with 0.25% to 5.00% by weight of a foaming agent.

6. The method of claim 1, wherein the step of combining the plastic filament with the foaming agent to form the composite filament comprises combining 97.25% to 99.50% by weight of a plastic filament with 0.50% to 2.50% by weight of a foaming agent.

* * * * *